(12) United States Patent
Apps et al.

(10) Patent No.: US 12,314,950 B2
(45) Date of Patent: May 27, 2025

(54) COMMUNICATION AND SIGNALING DEVICES AND METHODS

(71) Applicant: NCR Voyix Corporation, Atlanta, GA (US)

(72) Inventors: Shelby Frances Apps, Atlanta, GA (US); Gregory Keith Adams, Roswell, GA (US); Kwan Woo Lee, Johns Creek, GA (US); Grant Charles Paton, Dundee (GB)

(73) Assignee: NCR Voyix Corporation, Atlanta, GA (US)

( * ) Notice: Subject to any disclaimer, the term of this patent is extended or adjusted under 35 U.S.C. 154(b) by 66 days.

(21) Appl. No.: 16/697,530

(22) Filed: Nov. 27, 2019

(65) Prior Publication Data

US 2021/0158354 A1 May 27, 2021

(51) Int. Cl.
*G06Q 20/40* (2012.01)
*G06K 7/14* (2006.01)
(Continued)

(52) U.S. Cl.
CPC ....... *G06Q 20/4014* (2013.01); *G06K 7/1417* (2013.01); *G06Q 20/3226* (2013.01);
(Continued)

(58) Field of Classification Search
CPC ........... G06Q 20/4014; G06Q 20/3226; G06Q 20/385; G06Q 20/3278
(Continued)

(56) References Cited

U.S. PATENT DOCUMENTS

| 5,250,789 | A | * | 10/1993 | Johnsen | ................. | B62B 3/142 |
| | | | | | | 705/14.23 |
| 2002/0145038 | A1 | * | 10/2002 | O'Hagan | .......... | G06Q 30/0239 |
| | | | | | | 235/383 |

(Continued)

OTHER PUBLICATIONS

"Dornbusch, Jane, Scan on a mission, Nov. 9, 11, Globe Correspondent" (Year: 2011).*
(Continued)

*Primary Examiner* — Lindsay M Maguire
(74) *Attorney, Agent, or Firm* — Schwegman Lundberg & Woessner, P.A.

(57) ABSTRACT

Various embodiments herein include at least one of devices, systems, methods, and software of communication and signaling devices. One device embodiment includes a visual signaling output, at least one radio transceiver, and a network interface device. This device further includes a processor and a memory device storing instructions executable by the processor to cause the device to perform data processing activities that may include receiving an identifier via the at least one radio transceiver, outputting a work in progress indicator from the visual signaling output, and transmitting the received identifier via the network interface device to a network service. These data processing activities further include receiving a payment success indicator via the network interface device indicating whether a payment was successfully processed with regard to the received identifier. The data processing activities may then output an indication of the received payment success indicator from the visual signaling output.

6 Claims, 8 Drawing Sheets

(51) Int. Cl.
   *G06Q 20/32* (2012.01)
   *G06Q 20/38* (2012.01)
   *H04B 5/72* (2024.01)
   *H04W 4/80* (2018.01)

(52) U.S. Cl.
   CPC ....... *G06Q 20/3278* (2013.01); *G06Q 20/385* (2013.01); *H04B 5/72* (2024.01); *H04W 4/80* (2018.02)

(58) Field of Classification Search
   USPC .......................................................... 705/44
   See application file for complete search history.

(56) References Cited

U.S. PATENT DOCUMENTS

| | | | | |
|---|---|---|---|---|
| 2004/0222302 | A1* | 11/2004 | Matsumori | G06K 7/10851 235/472.01 |
| 2004/0249717 | A1* | 12/2004 | Shirasaki | G06Q 20/204 705/17 |
| 2012/0296751 | A1* | 11/2012 | Napper | G06Q 20/208 705/23 |
| 2013/0080719 | A1* | 3/2013 | Connelly | G07G 1/0036 711/154 |
| 2013/0218721 | A1* | 8/2013 | Borhan | G06Q 30/02 705/26.41 |
| 2014/0214577 | A1* | 7/2014 | Acker, Jr. | G01G 19/12 705/23 |
| 2020/0210982 | A1* | 7/2020 | Lapidos-Salaiz | G06Q 20/203 |

OTHER PUBLICATIONS

"Ready, set, scan: stop & shop launches scan it! Mobile App" Jul. 7, 2011, Businesswire (Year: 2011).*

* cited by examiner

COMMUNICATION AND SIGNALING DEVICES AND METHODS

BACKGROUND INFORMATION

Retail customers prefer quick, easy checkout experiences over waiting in slow moving lines. At the same time, retailers not only want to provide customers great experiences, they also want to minimize their operating costs and maximize their space for offering products. To achieve these goals, retailers have started implementing solutions where that allow customers to load an app of the retailer on their mobile devices that they use to scan items as they place items in their shop carts. Customers subsequently pay for their cart items through the app and exit the store. While customer experiences are often improved by eliminating checkout lines and retailers are able to provide customers better experiences and free up retail space through checkout line reduction and even eliminating some checkout stations, the experiences are still not optimal as some customers are unsure if they have paid and retailers have limited ability to know which customers have paid for all items.

SUMMARY

Various embodiments herein each include at least one of devices, systems, methods, and software of communication and signaling devices, such as may be deployed by retailers.

One embodiment, in the form of a device, includes a visual signaling output, at least one radio transceiver, and a network interface device. The device of such embodiments further includes a processor and a memory device storing instructions executable by the processor to cause the device to perform data processing activities. The data processing activities may include receiving an identifier via the at least one radio transceiver, outputting a work in progress indicator from the visual signaling output, and transmitting the received identifier via the network interface device to a network service. The data processing activities may further include receiving a payment success indicator via the network interface device indicating whether a payment was successfully processed with regard to the received identifier. The data processing activities of some embodiments may then output an indication of the received payment success indicator from the visual signaling output.

Another device embodiment includes at least one output device, a processor, and a memory device storing instructions executable by the processor to cause the device to perform data processing activities. The data processing activities of this embodiment include outputting an identifier from the at least one output device that uniquely identifies the device to a payment processing system and receiving, via a network from the payment processing system, an instruction to generate one of at least two outputs from the at least one output device indicating whether a transaction has been completed successfully.

An additional embodiment in the form of a method includes outputting an identifier from the at least one output device of a payment enabling and confirmation (PEAC) device that uniquely identifies the PEAC device to a payment processing system. The method further includes receiving, by the PEAC device via a network interface device, an instruction to generate one of at least two outputs from at least one output device indicating whether a transaction has been completed successfully.

DETAILED DESCRIPTION

Figure 1:
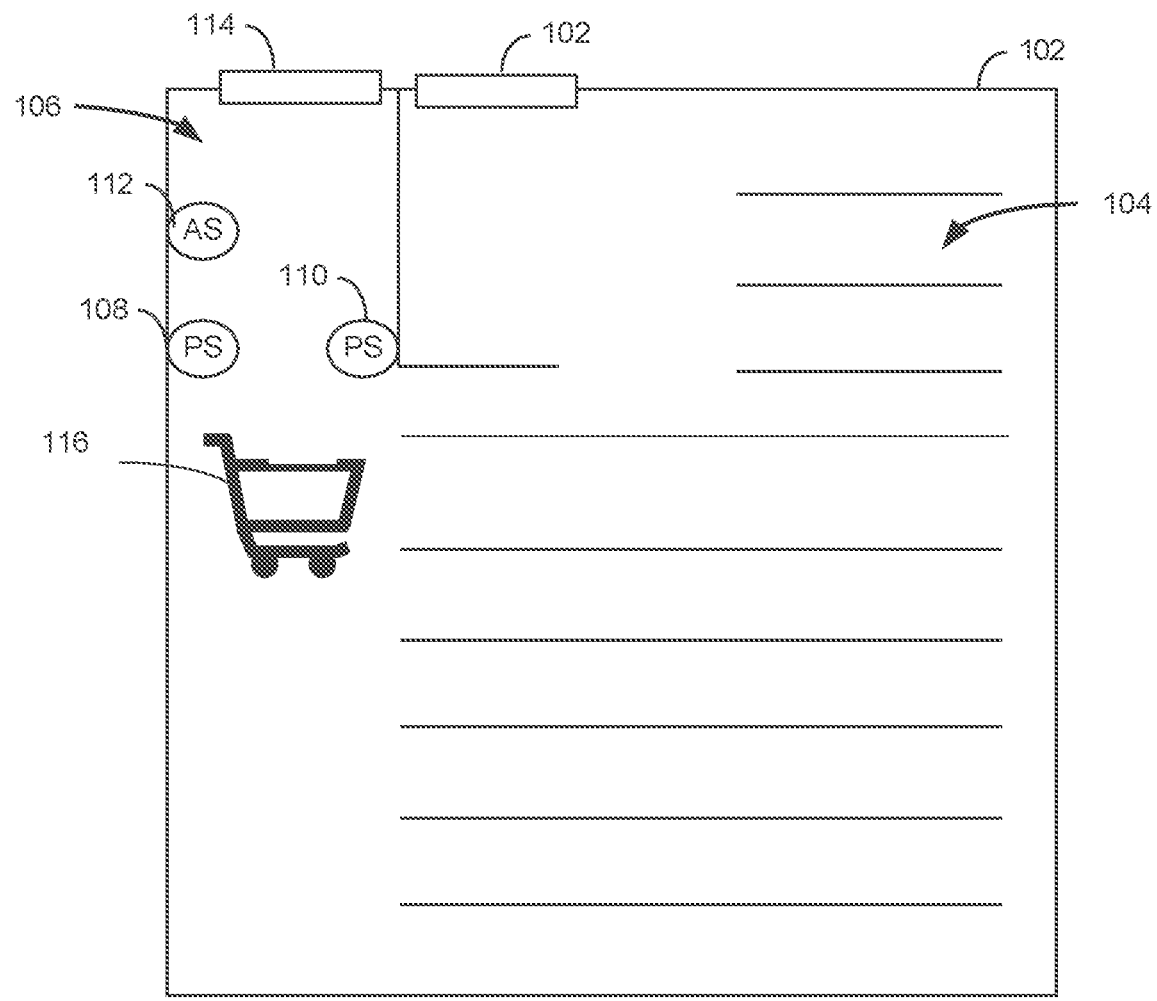
FIG. 1 is an illustration of a retail space with a system deployed therein, according to an example embodiment.

Various embodiments herein each include at least one of devices, systems, methods, and software of communication and signaling devices, such as may be deployed by retailers. A companion to these devices is a mobile app of a retailer that is utilized to scan items as they are added to a shopping cart, or otherwise carried. When checkout is desired, the mobile device is taken to one of the subject devices described and illustrated herein, as may be referred to as payment enabling and confirmation (PEAC) devices, and the mobile device and the app receive data from the PEAC device. The data may be received by a radio signal such as a Near Field Communication (NFC) or BLUETOOTH® signal, may be scanned by a camera of the mobile device such as a Quick Response (QR) code presented on a display of the PEAC device or affixed with a label thereon. Regardless, receipt of the data either informs the mobile device app of the location and enables a payment functionality of the mobile device app or is a data item that is to be included with payment data when submitted through the app and enables processing of the payment data when received by a backend system.

Through the payment functionality, the user may submit an input to a backend system over a network, such as the Internet, indicating the cart is ready for payment. This input may be submitted by the customer, a shopper of the retailer that is gathering items for the customer for an order submitted online, and the like. IN some embodiments, this input is submitted along with the data from the device. The payment may be submitted such as to be processed against payment information stored in the backend system in association with a customer account, payment information submitted via the mobile device app, or otherwise.

Once the payment has been processed, a signal may be sent by the backend system to the PEAC device either directly when the PEAC device has a network connection or to the mobile device app which may then relay the signal to the PEAC device via a peer-to-peer data radio communication, e.g., NFC, BLUETOOTH®, The PEAC device upon receipt of the signal outputs an indication that payment has been received. The indication may be output in one or more ways such as by, for example, illuminating a light, such as a green color, presenting text on a display, outputting audible sound from a speaker, and the like. However, if the payment is not processed successfully, a different signal may be sent and the PEAC device may output a corresponding indication, such as a red light, a different message, or different audible sound.

At the same time, such deployments may still offer shoppers an opportunity to commit fraud, theft, accidentally miss scanning items, and the like actions that lead to retail shrinkage. Thus, some embodiments include an audit signal that may be sent instead of a successful or unsuccessful payment signal. This signal may be output by the PEAC device in a similar manner, but with, for example, a yellow light, an audit message, or a further audible sound. This will inform the shopper and retailer personnel to review carted and scanned items to find any possible discrepancies. An audit signal may be generated randomly, at defined transactions intervals, e.g., once every 25 transactions, or based on one or more particular items being purchased, e.g., controlled items such as alcohol with age restrictions, expensive items of a price exceeding a threshold, items commonly associated with theft. An audit signal may also be generated at other times, such as based on inputs received from other systems, such as video monitoring systems that track shoppers and classify behavior, shopper history, and the like.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is an illustration of a retail space 100 with a system deployed therein, according to an example embodiment. The retail space 100 includes an entrance 102, a shopping area 104 with aisles, a payment area 106 and an exit 114. Shoppers enter through the entrance 102 and select items for purchase within the shopping area. As a shopper selects items for purchase, the shopper scans the items with an app that executes on their mobile device. The app utilizes a camera of the mobile device to scan the item, such as a barcode affixed thereto. The app communicates over a network with a backend system that adds the scanned items to a cart data structure (shown in FIG. 2 as "cart data structure 227") that hold data of items selected by the shopper for purchase and the shopper may add the item to their physical cart 116, bag, or other means for carrying items for purchase.

When the shopper has selected and scanned all items for purchase, the shopper proceeds to a pay area 106 of the retail space 100. With the mobile device app scanning option for shopping, such embodiments require the shopper to enter the pay area 106 to pay for the items in the cart. In particular, shoppers are required to come within range of a PEAC device 108, 110 such that the mobile device app may receive data therefrom, in some embodiments, before submitting their payment. In this way, all payments from mobile scanning shoppers will be received in a designated area enabling retailer personnel to provide assistance when paying and to monitor shoppers to ensure that they do in fact pay. Further, the pay stations 108 110 may output signals to shoppers and retailer personnel of successful payment receipt, errors in providing payment, and instruction to audit a shopper's cart. Such audit output may direct the shopper to an audit area 112, which may simply be a location where retailer personnel count items in view of receipt or cart data presented on a display as transmitted thereto by the backend system or it may be a teller assisted checkout station. Regardless, once the shopper has either successfully paid at one of the pay stations 108, 110 or has been successfully audited, the shopper then leaves from the exit 114.

Figure 2:
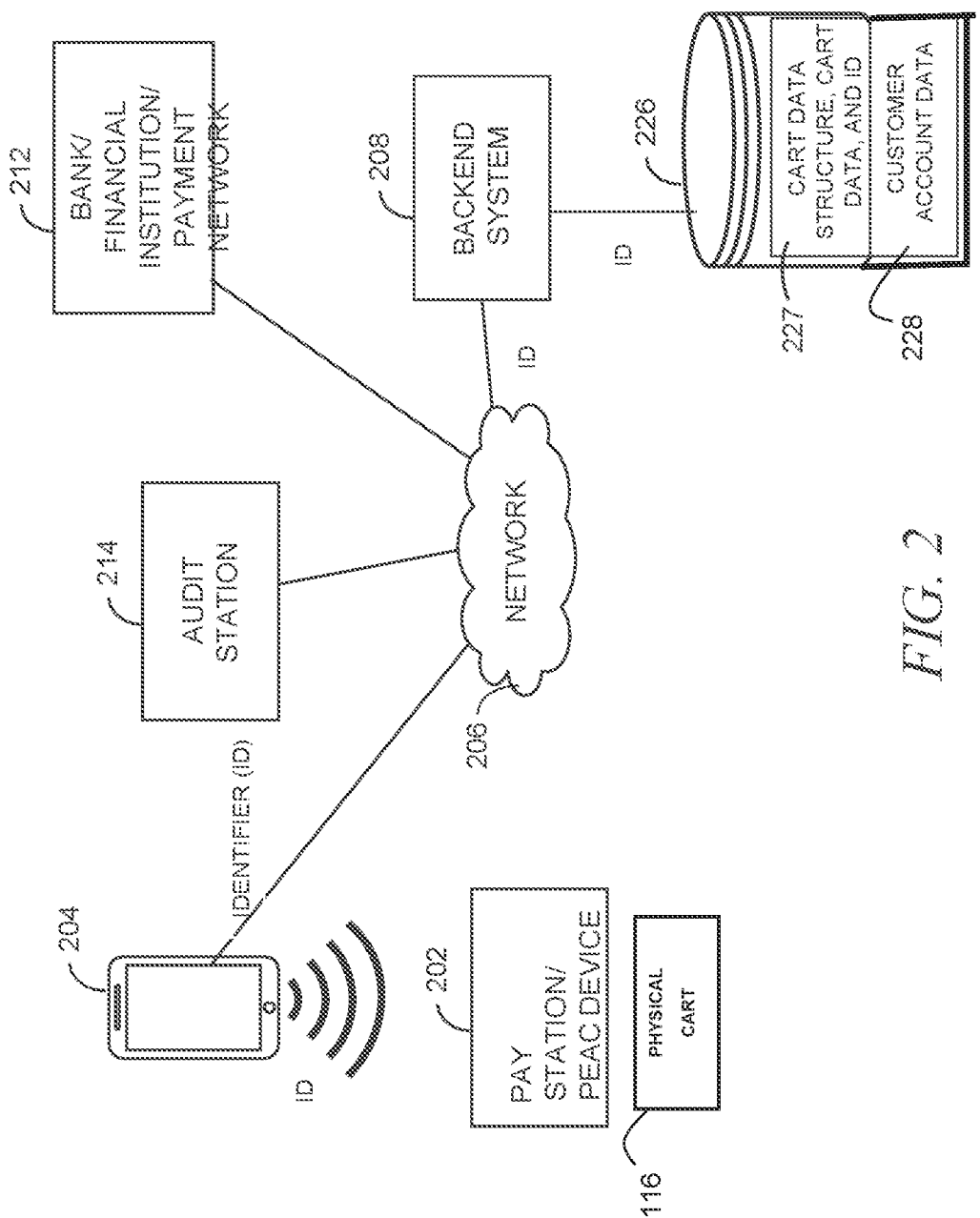
FIG. 2 is a logical block diagram of a system, according to an example embodiment.

FIG. 2 is a logical block diagram of a system 200, according to an example embodiment. The system 200 is an example of a system including a PEAC device 202 that may be deployed in a retail space, such as retail space 100 of FIG. 1, in some embodiments. The system 200 includes the PEAC device 202, a shopper mobile device 204 such as a smartphone, a network 206 such as the Internet, a backend computing system 208, a banking system 212 or payment processing network, and an optional audit station 214. The backend computing system 208 includes a data store 226 or storage to retain among other things, the cart data structure 227 with corresponding cart data, and identifier for the cart data. Data store 226 also include customer or shopper account data 228.

In some embodiments, mobile device 204 may be a smartphone. In other embodiments, the mobile device 204 may be another type of portable computing device that enables a shopper to scan or otherwise input item identifiers of items for purchase.

The PEAC device 202, in some embodiments, communicates only with shopper mobile devices 204. In some such embodiments, when the PEAC device 202 is to send or receive data over the network 206 such as to or from the backend system 208, the data is communicated via the mobile device 204. However, in other embodiments, the PEAC device 202 is connected to the network 206.

The optional audit station 214 is included in some, but not necessarily all embodiments. The audit station 214 may take one of several forms, such as that of a portable computing device, mobile device, and the like. However the audit system 214 may instead be a teller assisted checkout station, a self-service checkout station, a display or a printer that outputs a listing of cart items as received from the backend system 208 via the network 206, and the like.

The backend system 208 operates to perform several functions. These functions may therefore be deployed across several computing devices that operate in serial, in parallel, in support or in tandem with each other, and the like. Similarly, the backend system 208 may be deployed on one or more physical computing devices, on one or more virtual machines, and combinations therefore. The backend system 208 is connected to or has access to a database or data store 226 that stores customer account data 228 and transaction data, product data, cart data in the cart data structure 227 along with data structure identifier, and the like.

The banking system 212 is intended to reflect one or more financial institutions and payment processing networks, such as ACH check clearing, automated teller machine networks, credit card networks, SWIFT routing payment networks for wiring money, and the like. In operation, when the backed system 208 receives a payment request from a mobile device 204, the payment is processed by sending a payment request to the banking system 212. When the payment is successfully processed, the banking system 212 handles money transfer and the backend system 208 receives confirmation thereof, stores data in the database 226 with regard to the transaction, transmits a confirmation to one or both of the mobile device 204 and the PEAC device 202 which may receive the confirmation directly via the network or as relayed via the mobile device 204, and the PEAC device 202 outputs an indication of payment success. The indication of payment success may include the PEAC device 202 illuminating a green light, outputting an audible sound indicative of success, presenting text or an image on a display, and the like. The backend system 208 may also generate and transmit a receipt as text or an image to the mobile device 204 or other account of the shopper via email, text message, in app message, and the like.

Figure 3:
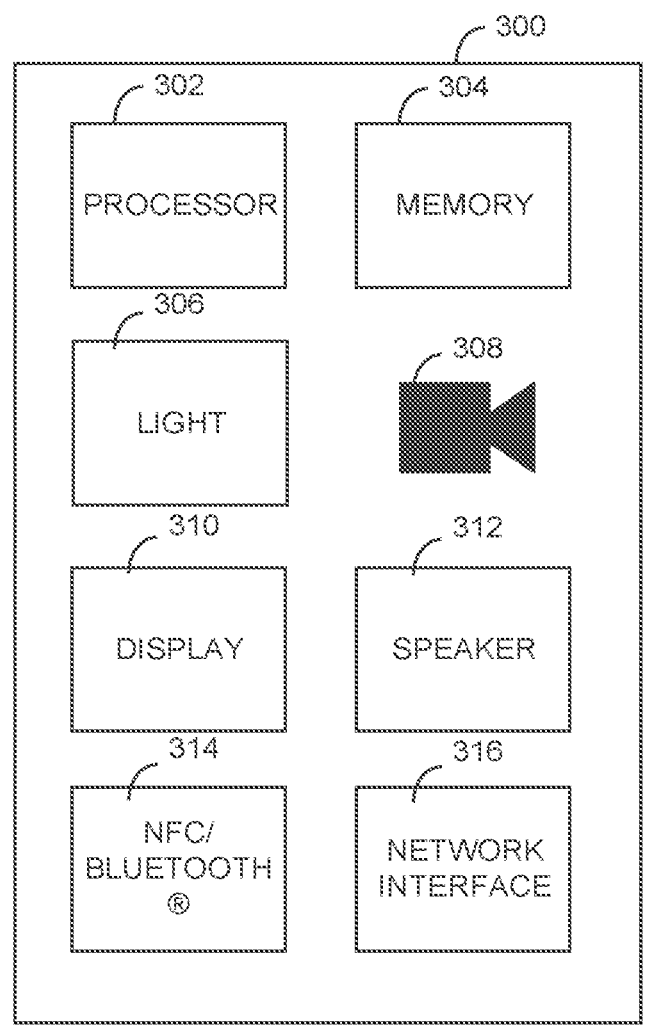
FIG. 3 is a logical block diagram of a device, according to an example embodiment.

FIG. 3 is a logical block diagram of a PEAC device 300, according to an example embodiment. The PEAC device 300 includes a processor 203, a memory 304, a light 306 that may be illuminated in various colors, and at least one radio transceiver such as an NFC and a BLUETOOTH® transceiver. The PEAC device 300 may also include one or more of a display 310, a speaker 312, a camera 308, and a network interface device 316.

In some embodiments, the memory 304 stores instructions that are executable by the processor 302 to control operation of the PEAC device 300. The light 306 may be selectively illuminated under control of the executed instructions to indicate various transaction status, such as by illuminating in certain colors or by blinking in certain ways. For example, the light 306 may be illuminated blue to indicate a transaction is in process, green to indicate payment success, red to indicate payment failure, yellow to instruct the shopper to go to an audit location or wait for retailer personnel to provide assistance, and the like. Similarly, when the PEAC device includes the speaker 312, audible signals correlating to each of the colors of the light 306 may be output. Some embodiments that include the display may also provide one or both of text and graphics associated with the color output, which may include instructions, greetings, expressions of gratitude, and the like.

In some embodiments, the transceiver 314 operates to communicate with a shopper mobile device to identify the PEAC device 314 to the mobile device. The mobile device may relay this identifier to a backend system along with at least one of a cart and shopper identifier to uniquely identify that cart that is the subject of the transaction and the PEAC device 314 where the shopper is located. However, in some embodiments of the PEAC device 314 that include the network interface device 316, the shopper mobile device identifies itself, such as by providing one or both of a shopper identifier and cart identifier, via the transceiver 314, and the PEAC device 300 transmits to the backend system via the network interface device 316 along with a unique identifier of the PEAC device 300. In some other embodiments, the customer mobile device may be identified on the PEAC device 300 by presenting an optical code, e.g., barcode or QR code, from a mobile device display or printed copy thereof, to the camera 308 of the PEAC' device. In two additional embodiments, the particular PEAC device 300 may be identified by the mobile device by scanning a similar code presented on the display 310 or otherwise affixed to the PEAC device 300. Regardless of the particular embodiment, the shopper mobile device either identifies the particular PEAC device 300 or the PEAC device identifies one or both of the particular shopper and particular cart.

In some additional embodiments, the camera 308 of the PEAC device 300 may be utilized to capture an image of a shopper. The image of the shopper may then be processed on the PEAC device 300, or transmitted via the network interface device 316 to a service for processing, to obtain an age estimate. The age estimate may be utilized in various embodiments to determine whether retail personnel should directed to the PEAC' device 300 to verify the shopper's age as compliant with an age requirement for a controlled item being purchased, such as alcohol or tobacco. The age verification may also be used in some embodiments for security purposes, such as to verify an age of a known shopper with a stored age. In other another embodiment, the camera 308 may be utilized for facial recognition to identify the shopper, and I some embodiments to charge an account associated with a facial recognition verified shopper identity.

Figure 4:
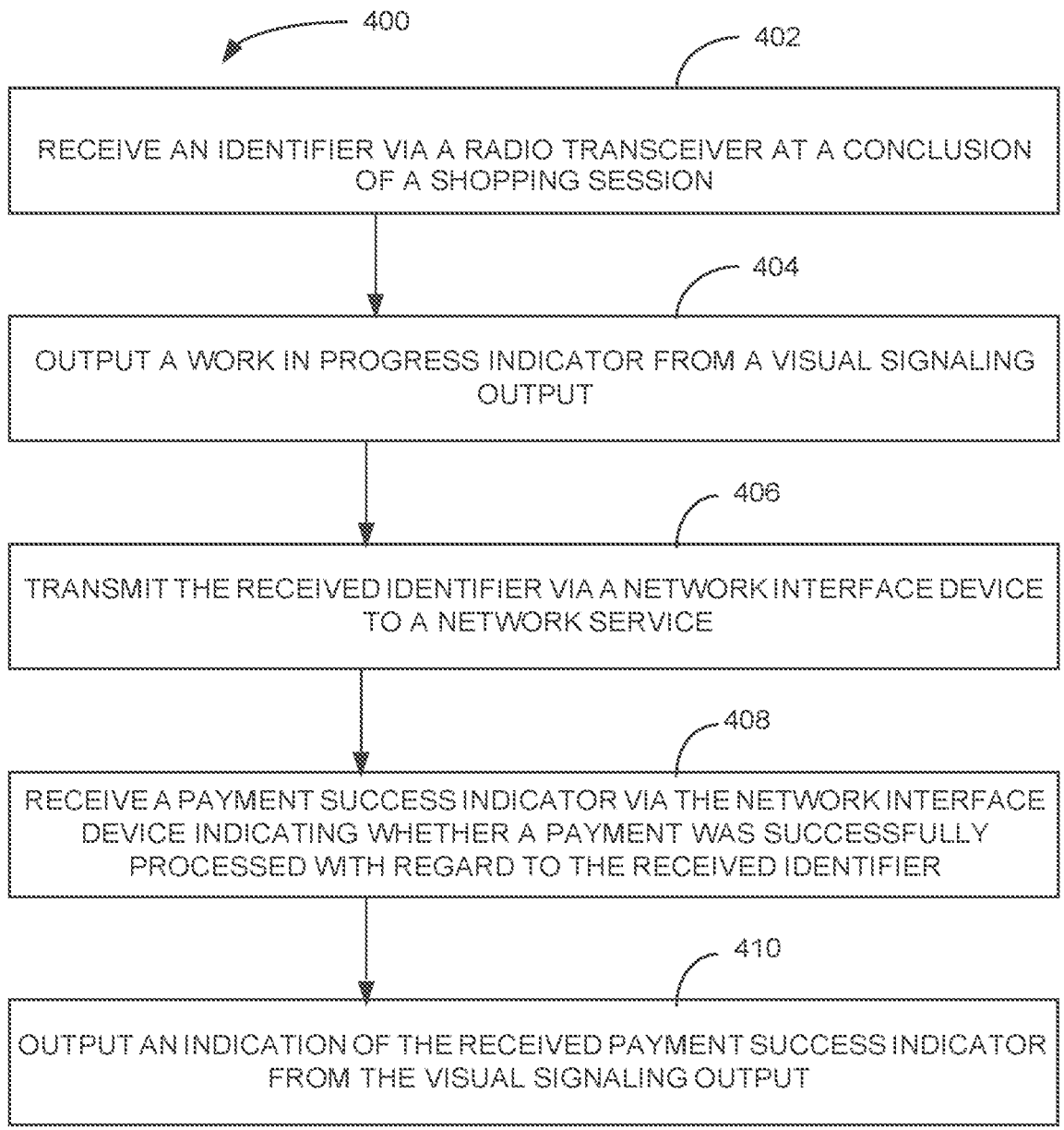
FIG. 4 is a block flow diagram of a method, according to an example embodiment.

FIG. 4 is a block flow diagram of a method 400, according to an example embodiment. The method 400 is an example of a method that may be performed on a PEAC device, according to an example embodiment.

The method 400 includes receiving 402 an identifier via a radio transceiver of the PEAC device at a conclusion of a shopping session. Some embodiments of the method 400 include outputting 404 a work in progress indicator from a visual signaling output, such as a light or display of the PEAC device. The method 400 continues by transmitting 406 the received identifier via a network interface device to a network service, such as may be provided by the backend system 208 of FIG. 2, and receiving 408 a payment success indicator via the network interface device indicating whether a payment was successfully processed with regard to the received identifier. The method 400 may then proceed by outputting 410 an indication from the visual signaling output of the received payment success indicator.

Some embodiments of the method 400 further include transmitting an identifier unique to the PEAC device from the at least one radio transceiver. In such embodiments, the PEAC device provides a beacon-like function that may be utilized in some embodiments for location finding services on mobile device and other such devices.

In some further embodiments that include outputting 404 the work in progress indicator from the visual signaling output, the output indication is from a light of the PEAC device in a first color when the received payment success indicator is that a payment was successfully processed and a second color when not successfully processed. For example, the first color may be green indicating success and the second color may be red indicating the payment was not processed. Some embodiments of the method 400 also include an audio signaling output that is utilized to output a first audible output indicating success and a second audible output indicating something other than success, such as a payment not being processed successfully.

Figure 5:
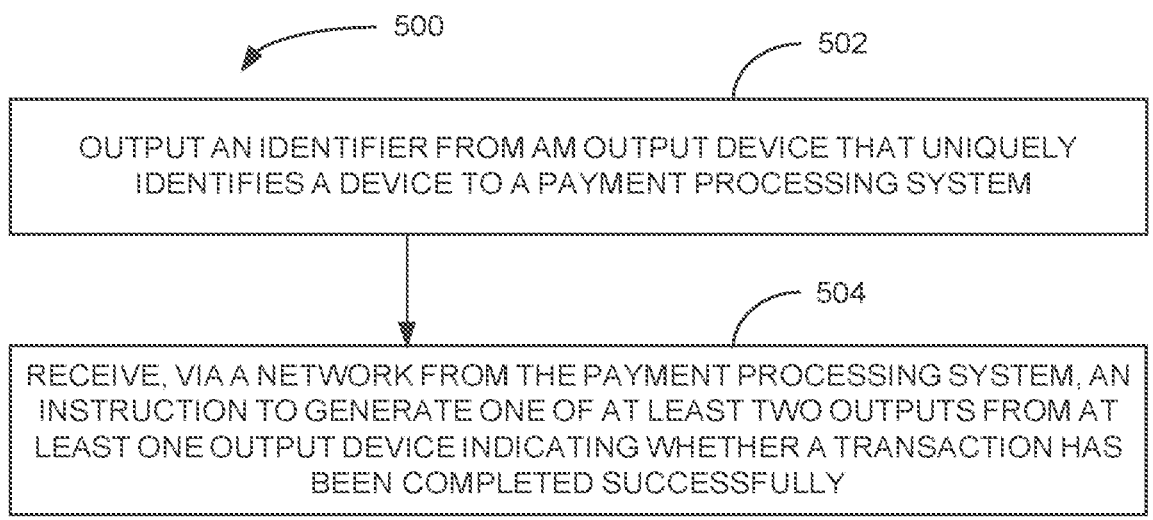
FIG. 5 is a block flow diagram of a method, according to an example embodiment.

FIG. 5 is a block flow diagram of a method 500, according to an example embodiment. The method 500 is another example method that may be performed by a PEAC device.

The method 500 includes outputting 502 an identifier from an output device that uniquely identifies the PEAC device to a payment processing system and receiving 504, via a network from the payment processing system, an instruction to generate one of at least two outputs from at least one output device indicating whether a transaction has been completed successfully.

Figure 6:
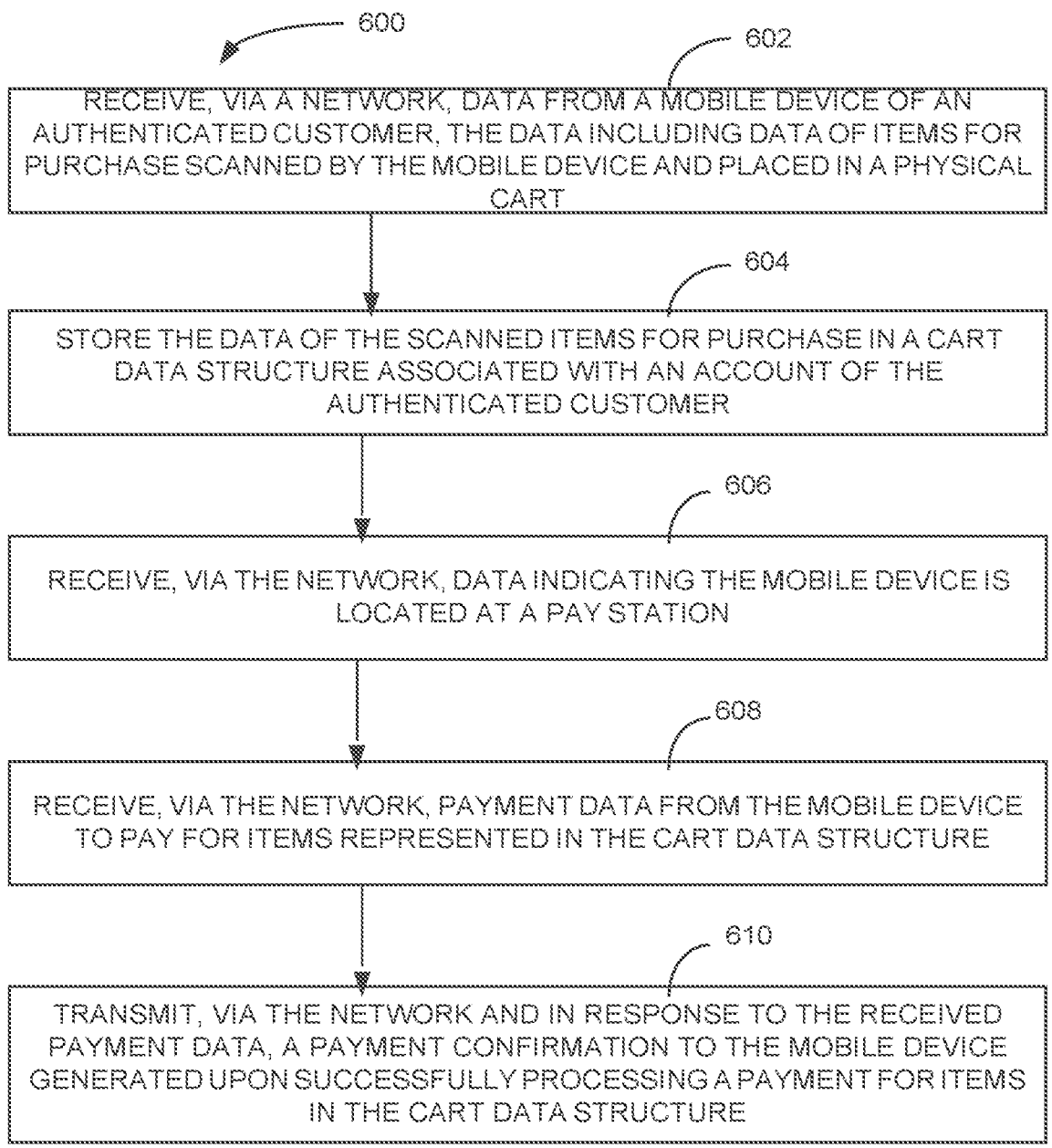
FIG. 6 is a block flow diagram of a method, according to an example embodiment.

FIG. 6 is a block flow diagram of a method 600, according to an example embodiment. The method 600 is an example of a method that may be performed by a backend system, such as the backend system 208 of FIG. 2.

The method 600 includes receiving 602, via a network, data from a mobile device of an authenticated customer. The received data in such embodiments typically includes at least data of items for purchase scanned by the mobile device. The method 600 further includes storing 604 the data of the scanned items for purchase in a cart data structure 227 associated with an account of the authenticated customer, such as in a memory, a database table of database 226, or other data structure. The method 600 then subsequently receives 606, via the network, data indicating the mobile device is located at a pay station, such as a PEAC device discussed above, and further 608 receiving, via the network, payment data from the mobile device to pay for items represented in the cart data structure 227. The method 600 further includes transmitting 610, via the network and in response to the received 608 payment data, a payment confirmation to the mobile device generated upon successfully processing a payment for items in the cart data structure 227.

In some embodiments, the method 600 also includes transmitting an instruction via the network to the pay station to generate an output indicating successful processing of the payment. In some embodiments, the transmitted 610 payment confirmation includes a message confirming the payment was successful and an amount of the payment, which may include an itemized receipt. The itemized receipt in some such embodiments may be transmitted as an image via a multi-media messaging service, such as MMS and the like or even as an attachment to an email. Alternatively, the itemized receipt may be transmitted as text in these or other messaging means that allow for communication of text.

In another embodiment of the method 600, the received 606 data indicating the mobile device is located at a pay station indicates the mobile device is located within a certain radius of the pay station. In some such embodiments, the radius may be determined based on an NFC device communication session established between the pay station and the customer mobile device. As an NFC signal is only able to travel a short distance, the radius of that signal and communication therewith indicates the distance is within the radius.

Figure 7:
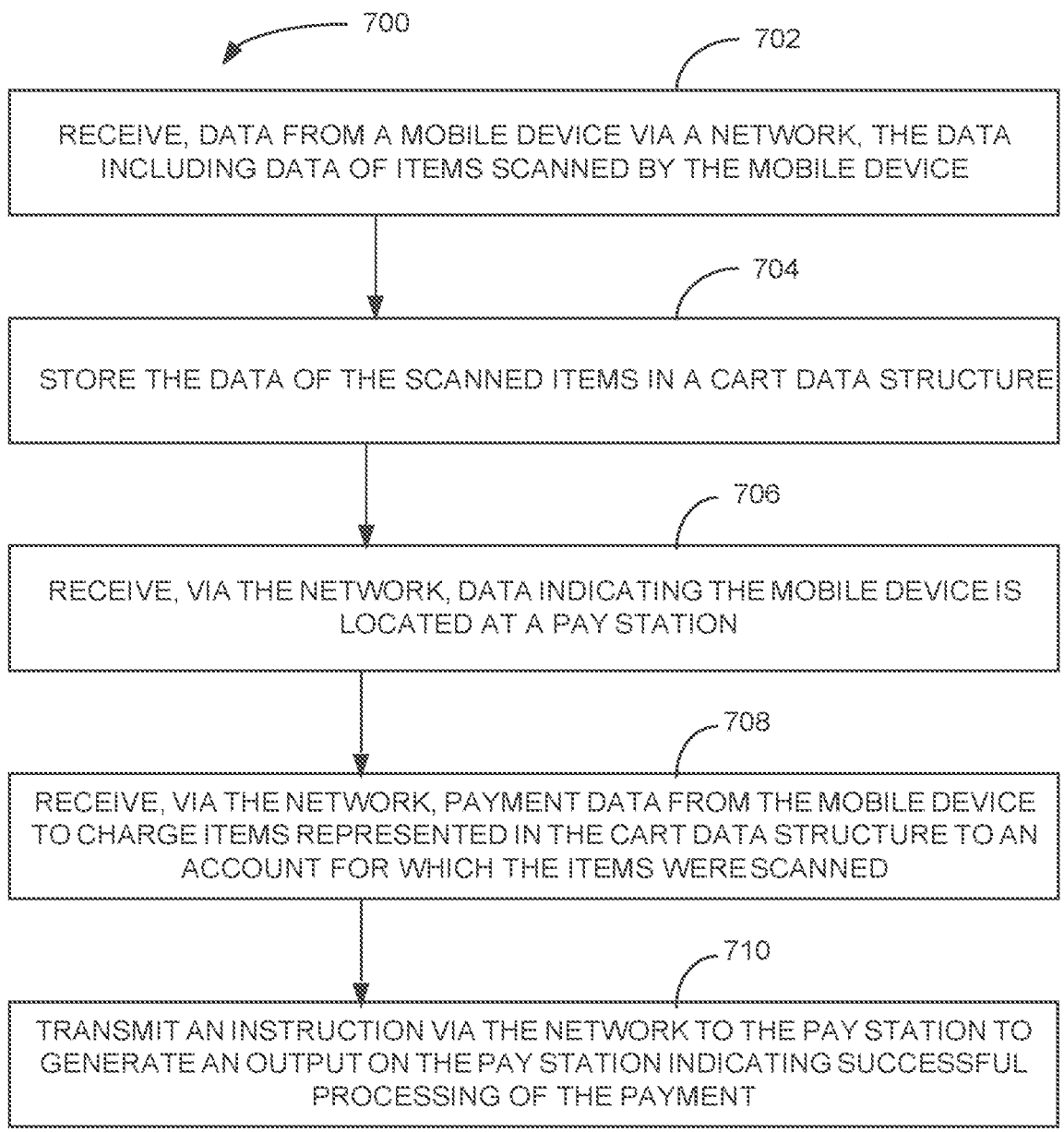
FIG. 7 is a block flow diagram of a method, according to an example embodiment.

FIG. 7 is a block flow diagram of a method 700, according to an example embodiment. The method 700 is a further example of a method that may be performed by a backend system.

The method 700 includes receiving 702, data from a mobile device via a network, including data of items scanned by the mobile device and storing 704 the data of the scanned items in a cart data structure 227 of database 226. The method 700 further includes receiving 706, via the network, data indicating the mobile device is located at a pay station and subsequently receiving 708, via the network, payment data from the mobile device to charge items represented in the cart data structure 227 to an account for which the items were scanned. The method 700 also includes transmitting 710 an instruction via the network to the pay station to generate an output on the pay station indicating successful processing of the payment.

In some embodiments, a customer account may include a stored list of items for purchase, such as a shopping list or an order. As items are added to the cart and stored 704, the method 700 may include removing those items from the list or marking those items as present in the cart and removing them once the transaction has been completed.

Some embodiments of the method 700, upon receipt 708 of the payment data, further include retrieving payment options stored in association with the account, if any, such as one or more of credit cards, checking accounts, gift cards, stored coupons, and the like and transmitting, via the network to the mobile device, a representation of the retrieved payment options and an option to input a new payment form. Such embodiments also include receiving, from the mobile device via the network, payment data of a selection of a payment option or data of a new payment form and processing the payment based on the received payment data.

Figure 8:
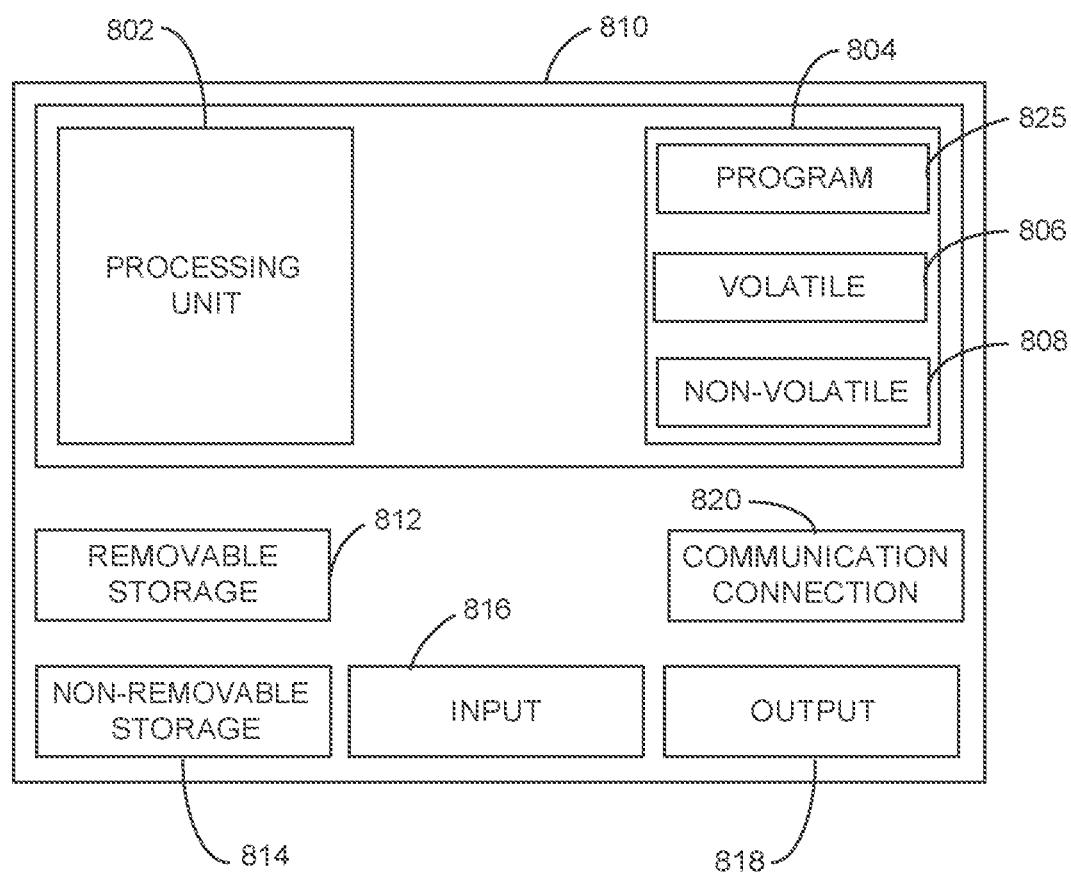
FIG. 8 is a block diagram of a computing device, according to an example embodiment.

FIG. 8 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 810, may include a processing unit 802, memory 804, removable storage 812, and non-removable storage 814. Although the example computing device is illustrated and described as computer 810, the computing device may be in different forms in different embodiments. For example, the computing device may instead be a smartphone, a tablet, smartwatch, or other computing device including the same or similar elements as illustrated and described with regard to FIG. 8. Devices such as smartphones, tablets, and smartwatches are generally collectively referred to as mobile devices. Further, although the various data storage elements are illustrated as part of the computer 810, the storage may also or alternatively include cloud-based storage accessible via a network, such as the Internet.

Returning to the computer 810, memory 804 may include volatile memory 806 and non-volatile memory 808. Computer 810 may include—or have access to a computing environment that includes a variety of computer-readable media, such as volatile memory 806 and non-volatile memory 808, removable storage 812 and non-removable storage 814. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 810 may include or have access to a computing environment that includes input 816, output 818, and a communication connection 820. The input 816 may include one or more of a touchscreen, touchpad, mouse, keyboard, camera, one or more device-specific buttons, one or more sensors integrated within or coupled via wired or wireless data connections to the computer 810, and other input devices. The computer 810 may operate in a networked environment using a communication connection 820 to connect to one or more remote computers, such as database servers, web servers, and other computing device. An example remote computer may include a personal computer (PC), server, router, network PC, a peer device or other common network node, or the like. The communication connection 820 may be a network interface device such as one or both of an Ethernet card and a wireless card or circuit that may be connected to a network. The network may include one or more of a Local Area Network (LAN), a Wide Area. Network (WAN), the Internet, and other networks. In some embodiments, the communication connection 820 may also or alternatively include a transceiver device, such as a BLUETOOTH® device that enables the computer 810 to wirelessly receive data from and transmit data to other BLUETOOTH® devices. For example, the communication connection 820 in some embodiments may be a BLUETOOTH® connection with a wireless headset that includes a speaker and a microphone. As such in these embodiments, a BLUETOOTH® transceiver device may be the audio output device as described elsewhere herein.

Computer-readable instructions stored on a computer-readable medium are executable by the processing unit 802 of the computer 810. A hard drive (magnetic disk or solid state), CD-ROM, and RAM are some examples of articles including a non-transitory computer-readable medium. For example, various computer programs 825 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A payment enabling and confirmation (PEAC) device comprising:
   a visual signaling output;
   at least one radio transceiver;
   a network interface device;
   a processor; and
   a memory device storing instructions executable by the processor to cause the PEAC device to perform data processing activities comprising:
   receiving, at a conclusion of a shopping session for items added to a physical cart and scanned with a shopper mobile device for purchase into a representative cart data structure, an identifier via the at least one radio transceiver, the identifier associated directly or indirectly with a shopper account including payment information and the cart data structure;
   outputting a work in progress indicator from the visual signaling output;
   transmitting the received identifier via the network interface device to a network service interfaced to an audit station, wherein the network service executes on a server device of a backend system;
   receiving a payment success indicator via the network interface device indicating whether a payment was successfully processed with regard to the received identifier, wherein the network interface device receives the payment success indicator from the network service;
   and
   outputting, by the PEAC device, which is a different device from the shopping mobile device that scanned the items, different from the server device, and different from the audit station, an indication of the received payment success indicator via the visual signaling output indicating items in the cart data structure and physical cart have been paid for, wherein the PEAC device enables the shopping mobile device via a signal provided by the PEAC device for payment processing activities, the signal confirms a presence of the shopper mobile device is within a distance of the PEAC prior to enabling the payment processing activities;
   wherein the visual signaling output includes a light that illuminates in a first color to indicate payment success and a second color to indicate payment was not successfully processed, and
   wherein the PEAC device includes a camera that captures an image of the shopper to enable facial recognition, identify the shopper, and charge an account associated with a facial recognition verified shopper identity.

2. The PEAC device of claim 1, wherein the data processing activities further comprising:
   transmitting an identifier unique to the PEAC device from the at least one radio transceiver.

3. The PEAC device of claim 1, wherein the output indication from the visual signaling output is a first color when the received payment success indicator is that a payment was successfully processed and a second color when not successfully processed.

4. The PEAC device of claim 3, further comprising:
   an audio signaling output; and
   wherein the data processing activities further comprising:
   outputting an indication of the received payment success indicator from the audio signaling output, the audio signaling output is a first audible output when the received payment success indicator is that a payment was successfully processed and a second audible output when not successfully processed.

5. The PEAC device of claim 1, wherein the at least one radio transceiver includes:
   a Near Field Communication (NFC) transceiver to communicate with an NFC transceiver of shopper mobile device to verify the shopper mobile device is located within a certain distance of the PEAC device.

6. The PEAC device of claim 1, wherein the at least one radio transceiver includes:
   a transceiver that broadcasts a beacon identifier that is registered in a positioning system to assist additional devices that receive the broadcast beacon identifier to determine a location.

* * * * *